July 14, 1942.   H. W. DENHARD ET AL   2,289,411
FILTER
Filed March 6, 1939
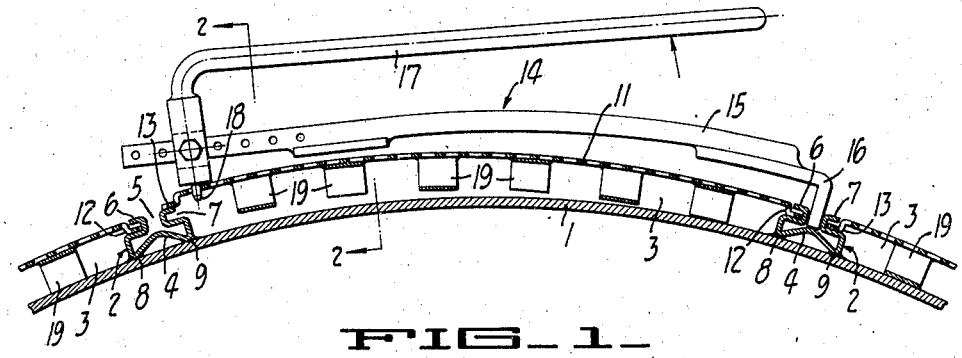
FIG_1_
FIG_2_   FIG_3_
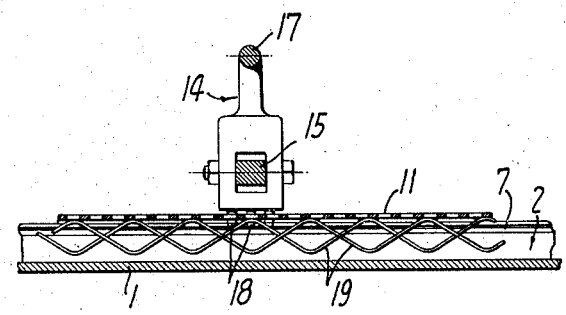
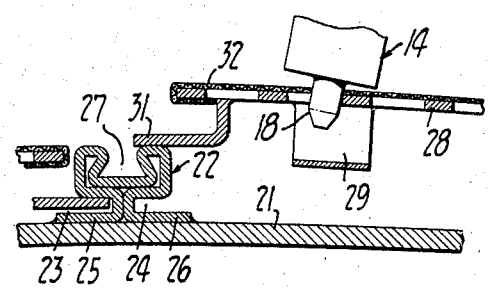
FIG_4_
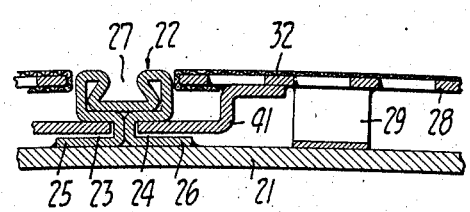
FIG_5_
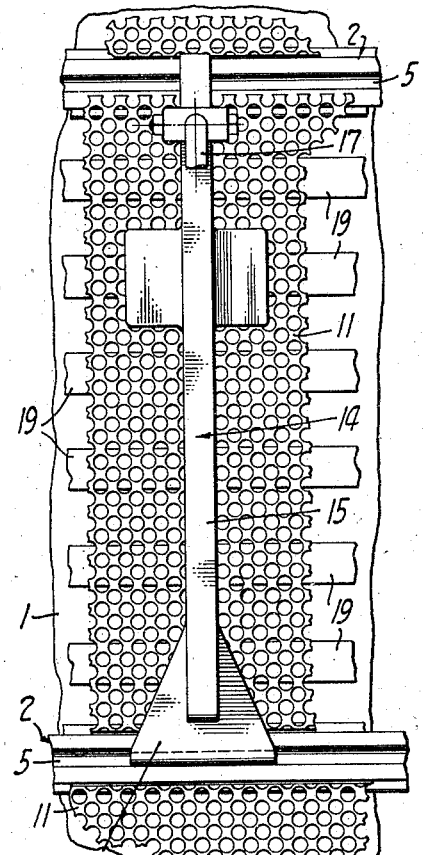
INVENTORS
HARRY W. DENHARD
ORVILLE B. ACKERLY JR.
BY
ATTORNEY.

Patented July 14, 1942

2,289,411

UNITED STATES PATENT OFFICE 2,289,411

FILTER

Harry W. Denhard, Berkeley, and Orville B. Ackerly, Jr., Piedmont, Calif., assignors to Oliver United Filters Incorporated, San Francisco, Calif., a corporation of Nevada Application March 6, 1939, Serial No. 260,106

9 Claims. (Cl. 210—199)

This invention relates in general to filters and more particularly to the construction of a filter cell or compartment of a rotary drum filter.

The surface of a rotary drum filter is divided into a series of contiguous independent filtrate cells or compartments by a plurality of spaced longitudinally extending parallel division strips secured to the drum. When using an all metal construction, considerable difficulty has been experienced in welding the division strips to the drum, for it has been found that the welding operation results in warpage of the division strip as well as of the drum. This is of course objectionable, for to operate in conjunction with a discharge scraper, scroll, or roll, the surface of the drum must be true.

The filter medium of a rotary drum filter is held in spaced relation with respect to the drum by a drainage or supporting screen. Oftentimes it is desirable to replace this screen or remove it in order to clean the drum.

In general the object of this invention is the provision of a drum construction wherein the division strips may be welded to the drum without causing any distortion in the drum or division strips and wherein the supporting screen may be firmly but detachably secured between adjacent division strips.

The invention possesses other advantageous features, some of which with the foregoing will be set forth at length in the following description where those forms of the invention which have been selected for illustration in the drawing accompanying and forming a part of the present specification are outlined in full. In said drawing, three forms of the invention are shown, but it is to be understood that it is not limited to such forms, since the invention as set forth in the claims may be embodied in a plurality of forms.

Referring to the drawing:

Figure 1 is a fragmentary vertical section of the drum of a rotary drum filter showing one of the filtrate compartments formed by adjacent division strips and also showing a tool for springing the supporting screen into place.

Figure 2 is a section taken on the line 2—2 of Figure 1.

Figure 3 is a plan view of the structure shown in Figure 1.

Figure 4 is a partial vertical section taken through the drum of a rotary drum filter and showing a modified form of division strip and supporting screen.

Figure 5 is a partial vertical section taken through the drum of a rotary drum filter and showing still another modification of the supporting screen.

As shown in Figure 1, the objects of my invention are embodied in a filter comprising a ductile metal drum 1, to the outer surface of which are welded a plurality of spaced division strips 2 serving with the drum 1 to define adjacent filtrate compartments 3. The division strip 2 may conveniently be made by rolling a sheet of ductile metal into a bar formed with a concave bottom face 4, a central channel 5, and two opposed lateral channels 6 and 7. The division strip 2 is welded to the drum 1 along the edges 8 and 9 of the division strip and the gage of the metal from which the division strip is made should not be greater than one-third the gage of the metal from which the drum is made. This ratio is of importance for the following reasons:

The heat dissipated by a sheet of metal is proportionate to its gage. The greater the gage of the metal, the greater the dissipation of heat and consequently the greater the number of calories required to bring the metal to a given temperature within a given time. The heat required to bring a sheet of metal up to the welding temperature likewise varies with the gage of the metal. It therefore follows that by making the division strip relatively thin at the point at which it is to be welded to the drum, a weld can be made without increasing the temperature of the drum at this point to such an extent that it is distorted by its resulting expansion or to such an extent that it is insufficiently rigid to prevent the division strip from becoming distorted. Although a division strip of rolled metal has been shown, obviously this result is not dependent upon the manner in which the division strip is fabricated, that is, whether it is made by rolling or drawing a sheet of metal or by milling a bar of metal, so long as that portion of the division strip in contact with the drum is relatively thin as compared to the drum.

Defining the upper limits of the compartment 3 is a supporting screen 11 made of a perforated plate and provided along each edge with offsets 12 and 13 adapted to be accommodated within the lateral channels 6 and 7 of the division strips 2. After the offset edge 12 of the supporting screen 11 has been inserted within the laterally extending channel of its associated division strip, its offset 13 may be sprung into the channel 7 of the opposed division strip by the pair of tongs generally designated as 14. These tongs consist of a base member 15 having a downwardly projecting portion 16 adapted to be accommodated within the channel 5 of a division strip, and an operating member 17 pivoted thereto and provided at one end with a number of pins 18 adapted to be inserted in the apertures of the supporting screen 11. Welded to the lower face of the supporting screen 11 in spaced parallel relation are a number of corrugated spacing members 19 of such depth that the outer surface of the screen 11 is level with the outer surfaces of the division strips 2. The location of the lateral channels 6 and 7 formed in the division strips 2 and the depth of the offsets 12 and 13 along the lateral edges of the supporting screen 11 are so related that the outer surface of the supporting screen 11 is flush with the outer surfaces of the division strips 2.

The filter medium, which has not been shown in Figures 2 and 3, may then be disposed over the surfaces of the supporting screens 11 and secured within the channel 5 of the division strip in any suitable and well known manner.

In Figure 4 a modified form of our invention is embodied in a filter comprising a drum 21 having welded to its outer surface a plurality of parallel spaced division strips 22. The division strip 22 is formed of rolled metal and is provided with laterally extending channels 23 and 24 immediately above its base members 25 and 26 and with an undercut channel 27 formed in its upper surface. A perforated supporting screen 28 provided with corrugated spacing members 29 is adapted to be secured along each of its lateral edges to the division strips 22 by L-shaped clips 31 arranged to be accommodated within the laterally extending channels 23 and 24 of the division strip. This construction is generally similar to the construction shown in Figures 1, 2, and 3, with the exception that the L-shaped clips have been substituted for the offsets 12 and 13 shown in Figures 1, 2, and 3, and that the lateral channels 24 and 25 of Figure 4 are adjacent the base of the division strip 22, whereas the laterally extending channels 6 and 7 of the division strip 2 are located adjacent the upper surface of the division strip. If as shown in Figure 4, the supporting screen 28 is covered with a fine mesh wire screen 32, the location of the laterally extending channels 24 and 25 and the clip 31 is such that the outer surface of the screen 32 is level with the outer surface of the division strip 22.

The construction shown in Figure 5 is identical with that shown in Figure 4 with the exception that a Z-shaped clip 41 has been substituted for the L-shaped clip shown in Figure 4.

From the above description it will be seen that we have provided a drum construction wherein the division strips may be welded to the drum without the usual danger of distorting one or both of these elements, wherein the supporting screen may be rigidly but readily attached to the drum and its associated division strips, and wherein the supporting screen may be readily detached from its associated members.

We claim:

1. A filter comprising: a filtrate compartment defined in part by a base member and a pair of spaced side members secured to said base member and each provided with laterally extending overhanging portions; a resilient supporting screen having a length greater than the distance between said overhanging portions, disposed within said compartment and secured to said side members by having its ends sprung beneath said overhanging portions; and spacing means for holding said base members and screen in spaced relation.

2. A filter comprising: a compartment defined in part by a base member and a pair of spaced side members secured to said base member and each provided along its inner side with a longitudinally extending channel; a resilient supporting screen having a length greater than the distance between said side members, disposed within said compartment and secured to said side members by having its ends sprung into said channels; and spacing means for holding said base member and screen in spaced relation.

3. A filter comprising; a compartment defined in part by a floor, and a pair of spaced side members secured thereto and each provided with a lateral longitudinally extending channel; a resilient supporting screen having a length greater than the distance between said side members, disposed within said compartment and secured to said side members by having its ends sprung into the lateral channels of the side members; and means associated with said screen for holding said screen and floor in spaced relation.

4. A filter comprising: a compartment defined in part by a backing plate and spaced division strips secured to said backing plate, each of said division strips having a lateral channel extending longitudinally thereof; and a resilient supporting screen disposed within said compartment and provided with spacing members secured to its lower surface, the ends of said supporting screen being provided with offset extensions arranged to be swung into the lateral channels of said division strips.

5. A filter comprising: a drum; a plurality of division strips secured to the outer surface of said drum in spaced relation and parallel to its axis; rabbets formed in the sides of said division strips; resilient supporting screens of greater length than the distance between said division strips sprung between adjacent division strips with their longitudinal edges disposed within said rabbets; and spacing means for holding said screens in spaced relation with said drum.

6. A filter comprising: a filtrate compartment defined in part by a pair of spaced side members, each provided with laterally extending overhanging portions; a resilient supporting screen disposed within said compartment and provided along its lateral edges with downwardly and outwardly extending offsets adapted to be sprung beneath said overhanging portions to detachably secure said screen to said side members.

7. A filter comprising: a compartment defined in part by a ductile metal backing member, a pair of spaced ductile metal side members each welded to said backing member by a base having a gage not greater than one-third the gage of said backing member, and end members secured to said backing member; a filter medium disposed over said compartment; and means for holding said filter medium spaced from said backing member.

8. A rotary drum filter comprising: a drum made of ductile metal; and a plurality of spaced parallel ductile metal division strips each welded to said drum by a base member having a gage not greater than one-third the gage of said drum.

9. A rotary drum filter comprising: a drum made of ductile metal and a ductile metal division strip welded thereto by a base having a gage not greater than one-third the gage of said drum.

HARRY W. DENHARD.
ORVILLE B. ACKERLY, Jr.